US008122228B2

(12) United States Patent
Faraj

(10) Patent No.: US 8,122,228 B2
(45) Date of Patent: Feb. 21, 2012

(54) BROADCASTING COLLECTIVE OPERATION CONTRIBUTIONS THROUGHOUT A PARALLEL COMPUTER

(75) Inventor: Ahmad Faraj, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/053,842

(22) Filed: Mar. 24, 2008

(65) Prior Publication Data

US 2009/0240915 A1    Sep. 24, 2009

(51) Int. Cl.
  *G06F 15/76* (2006.01)
(52) U.S. Cl. .......................................... 712/28; 709/201
(58) Field of Classification Search ...................... 712/28
  See application file for complete search history.

(56) References Cited

U.S. PATENT DOCUMENTS

| | | | |
|---|---|---|---|
| 4,715,032 A | 12/1987 | Nilsson | |
| 4,843,540 A | 6/1989 | Stolfo | |
| 5,105,424 A | 4/1992 | Flaig et al. | |
| 5,333,279 A | 7/1994 | Dunning | |
| 5,513,371 A | 4/1996 | Cypher et al. | |
| 5,541,914 A | 7/1996 | Krishnamoorthy et al. | |
| 5,617,538 A | 4/1997 | Heller | |
| 5,721,828 A | 2/1998 | Frisch | |
| 5,737,628 A * | 4/1998 | Birrittella et al. | 712/11 |
| 5,805,589 A * | 9/1998 | Hochschild et al. | 370/389 |
| 5,822,604 A | 10/1998 | Ogasawara et al. | |
| 5,832,215 A | 11/1998 | Kato et al. | |
| 5,864,712 A | 1/1999 | Carmichael et al. | |
| 5,878,241 A | 3/1999 | Wilkinson et al. | |
| 5,892,923 A | 4/1999 | Yasuda et al. | |
| 5,937,202 A | 8/1999 | Crosetto et al. | |
| 5,949,988 A | 9/1999 | Feisullin et al. | |
| 5,958,017 A | 9/1999 | Scott et al. | |
| 6,000,024 A | 12/1999 | Maddox et al. | |
| 6,067,609 A | 5/2000 | Meeker et al. | |
| 6,076,131 A | 6/2000 | Nugent | |
| 6,167,502 A * | 12/2000 | Pechanek et al. | 712/15 |

(Continued)

FOREIGN PATENT DOCUMENTS

EP    1835414 A2    9/2007

OTHER PUBLICATIONS

M. Matsuda, T. Kudoh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.*

(Continued)

*Primary Examiner* — Idriss N Alrobaye
(74) *Attorney, Agent, or Firm* — Biggers & Ohanian LLP

(57) ABSTRACT

Methods, systems, and products are disclosed for broadcasting collective operation contributions throughout a parallel computer. The parallel computer includes a plurality of compute nodes connected together through a data communications network. Each compute node has a plurality of processors for use in collective parallel operations on the parallel computer. Broadcasting collective operation contributions throughout a parallel computer according to embodiments of the present invention includes: transmitting, by each processor on each compute node, that processor's collective operation contribution to the other processors on that compute node using intra-node communications; and transmitting on a designated network link, by each processor on each compute node according to a serial processor transmission sequence, that processor's collective operation contribution to the other processors on the other compute nodes using inter-node communications.

18 Claims, 13 Drawing Sheets

U.S. PATENT DOCUMENTS

| | | | |
|---|---|---|---|
| 6,212,617 | B1 | 4/2001 | Hardwick |
| 6,230,252 | B1 * | 5/2001 | Passint et al. ............... 712/12 |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,378,029 | B1 * | 4/2002 | Venkitakrishnan et al. .. 710/317 |
| 6,480,885 | B1 | 11/2002 | Olivier |
| 6,480,918 | B1 * | 11/2002 | McKenney et al. ........... 710/200 |
| 6,714,552 | B1 | 3/2004 | Cotter |
| 6,742,063 | B1 | 5/2004 | Hellum et al. |
| 6,754,211 | B1 | 6/2004 | Brown |
| 6,914,606 | B2 | 7/2005 | Amemiya et al. |
| 7,133,359 | B2 | 11/2006 | Weis |
| 7,197,624 | B2 * | 3/2007 | Pechanek et al. ............... 712/11 |
| 7,263,598 | B2 | 8/2007 | Ambuel |
| 7,284,033 | B2 | 10/2007 | Jhanji |
| 7,496,699 | B2 | 2/2009 | Pope et al. |
| 7,539,989 | B2 | 5/2009 | Blackmore et al. |
| 7,664,110 | B1 | 2/2010 | Lovett et al. |
| 7,853,639 | B2 | 12/2010 | Archer et al. |
| 2001/0005873 | A1 * | 6/2001 | Yasuda et al. ................ 710/129 |
| 2002/0016901 | A1 | 2/2002 | Carvey et al. |
| 2002/0054051 | A1 | 5/2002 | Ladd |
| 2002/0065984 | A1 | 5/2002 | Thompson et al. |
| 2002/0144027 | A1 | 10/2002 | Schmisseur |
| 2003/0188054 | A1 | 10/2003 | Yosimoto et al. |
| 2003/0212877 | A1 | 11/2003 | Dally et al. |
| 2004/0034678 | A1 | 2/2004 | Kuszmaul et al. |
| 2004/0073590 | A1 | 4/2004 | Bhanot et al. |
| 2004/0073755 | A1 * | 4/2004 | Webb et al. ................... 711/144 |
| 2005/0094577 | A1 | 5/2005 | Ashwood-Smith |
| 2005/0165980 | A1 | 7/2005 | Clayton et al. |
| 2005/0243711 | A1 | 11/2005 | Alicherry et al. |
| 2006/0168359 | A1 | 7/2006 | Bissessur et al. |
| 2006/0179181 | A1 | 8/2006 | Seong |
| 2006/0277323 | A1 | 12/2006 | Joublin et al. |
| 2007/0011408 | A1 * | 1/2007 | Shen et al. ................... 711/146 |
| 2007/0081516 | A1 * | 4/2007 | Arimilli et al. ............... 370/351 |
| 2007/0110063 | A1 | 5/2007 | Tang et al. |
| 2007/0174558 | A1 | 7/2007 | Jia et al. |
| 2007/0242609 | A1 * | 10/2007 | Archer et al. ................ 370/241 |
| 2007/0242611 | A1 * | 10/2007 | Archer et al. ................ 370/242 |
| 2007/0242685 | A1 * | 10/2007 | Archer et al. ................ 370/408 |
| 2007/0245122 | A1 * | 10/2007 | Archer et al. ................... 712/17 |
| 2007/0260909 | A1 * | 11/2007 | Archer et al. ..................... 714/4 |
| 2007/0288935 | A1 | 12/2007 | Tannenbaum et al. |
| 2008/0101232 | A1 * | 5/2008 | Archer et al. ................ 370/235 |
| 2008/0127146 | A1 | 5/2008 | Liao et al. |
| 2008/0229059 | A1 * | 9/2008 | May ................................ 712/16 |
| 2008/0301683 | A1 | 12/2008 | Archer et al. |
| 2008/0313661 | A1 * | 12/2008 | Blocksome et al. .......... 719/330 |
| 2009/0006662 | A1 | 1/2009 | Chen et al. |
| 2009/0064149 | A1 * | 3/2009 | Singh et al. ................... 718/101 |
| 2009/0064176 | A1 | 3/2009 | Ohly et al. |
| 2009/0067334 | A1 | 3/2009 | Archer et al. |
| 2009/0089512 | A1 * | 4/2009 | Shen et al. ................... 711/146 |
| 2009/0113308 | A1 * | 4/2009 | Almasi et al. ................ 715/734 |
| 2009/0154486 | A1 | 6/2009 | Archer et al. |
| 2009/0196361 | A1 | 8/2009 | Chan et al. |
| 2009/0292905 | A1 | 11/2009 | Faraj |
| 2010/0122268 | A1 | 5/2010 | Jia |
| 2010/0185718 | A1 | 7/2010 | Archer et al. |
| 2011/0119673 | A1 | 5/2011 | Bloch et al. |

OTHER PUBLICATIONS

Herbordt, M.C., Weems, C.C.; "Computing Parallel Prefix And Reduction Using Coterie Structures"; Frontiers of Massively Parallel Computation; 1992; Fourth Symposium; Oct 19-21, 1992; pp. 141-149.

Fisher, et al.; "Computing The Hough Transform On A Scar Line Array Processor"; IEEE Transactions On Pattern Analysis And Machine Intelligence; vol. II, No. 3; Mar. 1989; pp. 262-265.

Office Action, U.S. Appl. No. 11/737,209, Jul. 20, 2009.
Office Action, U.S. Appl. No. 11/843,090, Sep. 4, 2009.
Sunggu Lee; Shin, K.G., "Interleaved all-to-all reliable broadcast on meshes and hypercubes," Parallel and Distributed Systems, IEEE Transactions on, vol. 5, pp. 449-458, May 1994.
Wikipedia. "Depth-First Search" May 5, 2007. http://web.archive.org/web/20070505212029/http://en.wikipedia.org/wiki/Depth-first_Search.
Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.
U.S. Appl. No. 60/271,124, filed Feb. 24, 2001, pp. 12-13, 27 and 42-43.
Sistare, et al.; Optimization of MPI collectives on clusters of large-scale SMP's, Conference on High Performance Networking and Computing, Proceedings of the 1999 ACM/IEEE conference on Supercomputing; 1999.
Tanenbaum, Structured Computer Organization, Second Edition, Prentice-Hall, Inc., 1984.
Rosenberg; Dictionary of Computers, Information Processing & Telecommunications, Second Edition, John Wiley & Sons, 1987.
Office Action, U.S. Appl. No. 11/279,620, Mar. 4, 2008.
Office Action, U.S. Appl. No. 11/279,620, Sep. 3, 2008.
Office Action, U.S. Appl. No. 11/279,620, Dec. 29, 2008.
Office Action, U.S. Appl. No. 11/769,367, Apr. 3, 2009.
Office Action, U.S. Appl. No. 11/459,387, Dec. 13, 2007.
Office Action, U.S. Appl. No. 11/459,387, Jul. 11, 2008.
Office Action, U.S. Appl. No. 11/459,387, Mar. 18, 2009.
Office Action, U.S. Appl. No. 11/737,286, Feb. 9, 2009.
M. Matsuda, T. Koduh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.
Dado: A Tree-Structured Machine Architecture for Production Systems, Stolfo et al. AAAI Proceedings, 1982, Columbia University.
Eunseuk Oh, An All-Reduce Operation in Star Networks Using All-to-All Broadcast Communication Patterns, 2005, 1-8.
Xin Yuan, Bandwidth Efficient All-reduce Operation on Tree Topologies, 2001, 1-8.
Final Office Action, U.S. Appl. No. 11/769,367, Sep. 28, 2010.
Final Office Action, U.S. Appl. No. 12/053,842, Oct. 18, 2010.
Advisory Action, U.S. Appl. No. 12/053,842, Jan. 11, 2011.
Office Action, U.S. Appl. No. 12/053,842, Mar. 1, 2011.
Office Action, U.S. Appl. No. 12/503,902, Oct. 6, 2010.
Office Action, U.S. Appl. No. 12/060,492, May 27, 2010.
Final Office Action, U.S. Appl. No. 12/060,492, Dec. 2, 2010.
Office Action, U.S. Appl. No. 12/124,763, Oct. 14, 2010.
Office Action, U.S. Appl. No. 12/124,756, Oct. 18, 2010.
Office Action, U.S. Appl. No. 11/754,740, Apr. 11, 2011.
Final Office Action, U.S. Appl. No. 12/124,756, Mar. 28, 2011.
Edmonds, "AM++: A Generalized Active Message Framework," pp. 1-10, Sep. 2010.
Bangalore. "Extending the Message Passing Interface (MPI)", Proc. of the 1994 Conf. on Scalable Parallel Libraries, IEEE, pp. 106-118, 1995.
Bafna, "Coprocessor Design to Support MPI Primitives in Configurable Mutliprocessors;" *Integration, the VSLI Journal*, vol. 40, Issue 3, pp. 235-252, Apr. 2007.
Keller, Rainer; "MPI Development Tools and Applications for the Grid," Jun. 2003, pp. 1-12.
Tang, Hong; "Optimizing threaded MPI execution on SMP clusters," *International Conference on Supercomputer*, Jun. 2001, pp. 381-392.
Office Action, U.S. Appl. No. 11/754,782, Jun. 23, 2011.
Final Office Action, U.S. Appl. No. 12/053,842, May 23, 2011.
Office Action, U.S. Appl. No. 12/176,816, Jun. 10, 2011.

* cited by examiner

BROADCASTING COLLECTIVE OPERATION CONTRIBUTIONS THROUGHOUT A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for broadcasting collective operation contributions throughout a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. In the current art, however, the tree network does not lend itself to and is typically inefficient for point-to-point operations. Although in general the torus network and the tree network are each optimized for certain communications patterns, those communications patterns may be supported by either network.

One of the most common communications patterns utilized in a parallel computer is an all-to-all communication pattern. An all-to-all communication pattern is often used in sorting, matrix multiplication, and matrix transposition application. In this communication pattern, each compute node sends a distinct message to each other compute node in the parallel computer—resulting in a communication pattern that is extremely network intensive.

Because of the importance of the all-to-all communications pattern and because of the network intensive nature of the pattern, many algorithms exist to optimize the all-to-all communications pattern on a variety of computing platforms. The drawback, however, is that such algorithms are designed for parallel computers having single-processor compute nodes that exclusively utilize a distributed-memory architecture, and therefore these algorithms typically do not operate efficiently in parallel computers with multi-core compute nodes or nodes that utilize shared memory. In such parallel computers, the inefficiencies often result from bandwidth constraints as multiple processors on a compute node compete for use of the same network links to pass their all-to-all contributions to the other compute nodes through the network.

SUMMARY OF THE INVENTION

Methods, systems, and products are disclosed for broadcasting collective operation contributions throughout a parallel computer. The parallel computer includes a plurality of compute nodes connected together through a data communications network. Each compute node has a plurality of processors for use in collective parallel operations on the parallel computer. Broadcasting collective operation contributions throughout a parallel computer according to embodiments of the present invention includes: transmitting, by each processor on each compute node, that processor's collective operation contribution to the other processors on that compute node using intra-node communications; and transmitting on a designated network link, by each processor on each compute node according to a serial processor transmission sequence, that processor's collective operation contribution to the other processors on the other compute nodes using inter-node communications.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
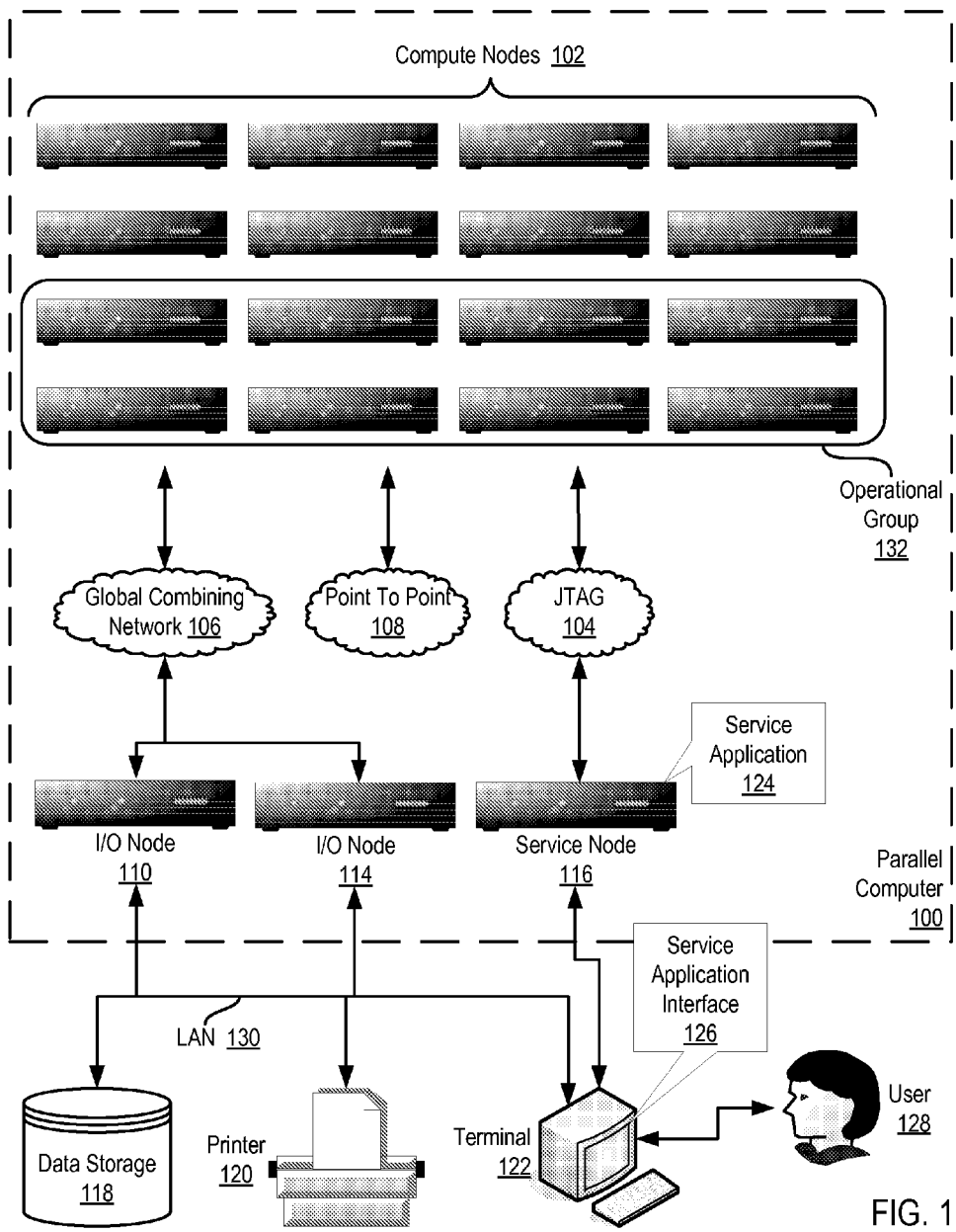
FIG. 1 illustrates an exemplary parallel computer for broadcasting collective operation contributions throughout a parallel computer according to embodiments of the present invention.

Exemplary methods, apparatus, and computer program products for broadcasting collective operation contributions throughout a parallel computer according to embodiments of the present invention are described with reference to the accompanying drawings, beginning with FIG. 1. FIG. 1 illustrates an exemplary parallel computer for broadcasting collective operation contributions throughout a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

Each compute node (102) includes a plurality of processors for use in collective parallel operations on the parallel computer (100). The processors of each compute node (102) in FIG. 1 are operatively coupled to computer memory such as, for example, random access memory ('RAM'). Each compute node (102) may operate in several distinct modes that affect the relationship among the processors and the memory on that node. In one mode, the processors of a compute node may operate independently of one another, and each processor may utilize a partition of the node's memory that is exclusively dedicated to that processor. In another mode, one of the processors acts as a master and the remaining processors serve as slaves to the master processor, and each processor has access to the full range of computer memory on the compute node. Readers will note that the exemplary modes described above are for explanation only and not for limitation that each compute node may also operate in other modes as will occur to those of skill in the art.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with network links among the compute nodes (102). The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is typically referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the various processes running on the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

As mentioned above, most collective operation communications patterns build off of these basic collective operations. One such communications pattern is a gossiping communications pattern in which one set of compute nodes communicates with another set of compute nodes. The two sets of nodes participating in the gossip communications pattern could be the same or different. Examples of gossiping communications patterns implemented using MPI may include an all-to-all operation, an all-to-allv operation, an allgather operation, an allgatherv operation, and so on.

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, each processor in each compute node (102) of FIG. 1 includes computer program instructions for broadcasting collective operation contributions throughout a parallel computer according to embodiments of the present invention. Collective operation contributions are data that the process running on each individual processor contributes to a collective operation. For example, in an all-to-all collective operation, the collective operation contributions are the various data segments that each processor transmits to each of the other processors in the parallel computer. Each processor in each compute node (102) of FIG. 1 operates generally for broadcasting collective operation contributions throughout a parallel computer according to embodiments of the present invention by: transmitting, by each processor on each compute node, that processor's collective operation contribution to the other processors on that compute node using intra-node communications; and transmitting on a designated network link, by each processor on each compute node according to a serial processor transmission sequence, that processor's collective operation contribution to the other processors on the other compute nodes using inter-node communications. The serial processor transmission sequence specifies the order in which each processor on a compute node may access the designated network link for transmitting a collective operation contribution through the network to another compute node.

The arrangement of nodes, networks, and I/O devices making up the exemplary system illustrated in FIG. 1 are for explanation only, not for limitation of the present invention. Data processing systems capable of broadcasting collective operation contributions throughout a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Broadcasting collective operation contributions throughout a parallel computer according to embodiments of the present invention may be generally implemented on a parallel computer that includes a plurality of compute nodes. In fact, such computers may include thousands of such compute nodes. Each compute node is in turn itself a kind of computer composed of a plurality of computer processors (or processing cores), its own computer memory, and its own input/output adapters. For further explanation, therefore, FIG. 2 sets forth a block diagram of an exemplary compute node useful in a parallel computer capable of broadcasting collective operation contributions throughout a parallel computer according to embodiments of the present invention. The compute node (152) of FIG. 2 includes a plurality of processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Computer program instructions for broadcasting collective operation contributions throughout a parallel computer according to embodiments of the present invention typically reside in the application (158) or the messaging module (160). Such instructions may operate generally for broadcasting collective operation contributions throughout a parallel computer according to embodiments of the present invention by: transmitting, by each processor on each compute node, that processor's collective operation contribution to the other processors on that compute node using intra-node communications; and transmitting on a designated network link, by each processor on each compute node according to a serial processor transmission sequence, that processor's collective operation contribution to the other processors on the other compute nodes using inter-node communications.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
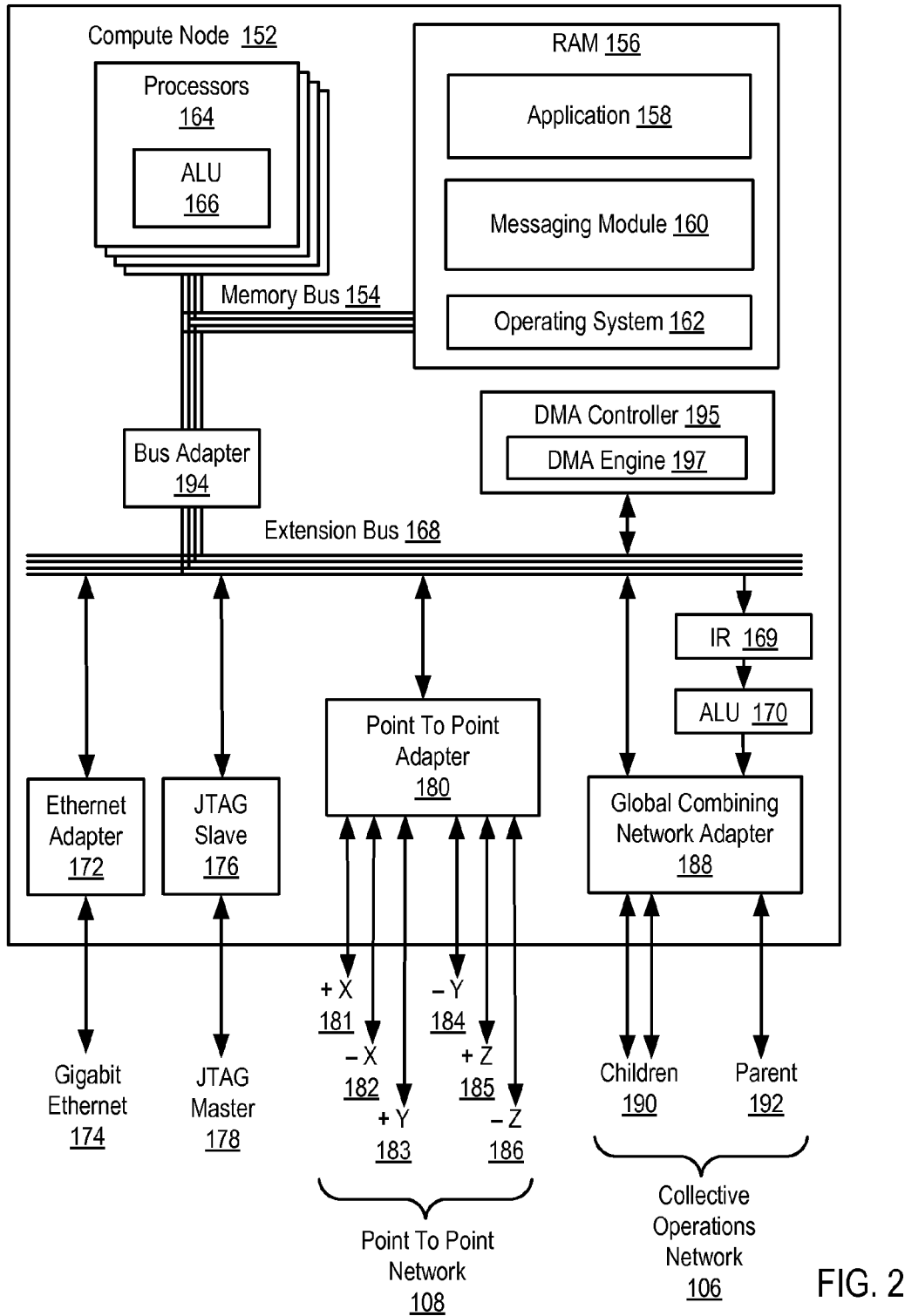
FIG. 2 sets forth a block diagram of an exemplary compute node useful in a parallel computer capable of broadcasting collective operation contributions throughout a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for broadcasting collective operation contributions throughout a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in broadcasting collective operation contributions throughout a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
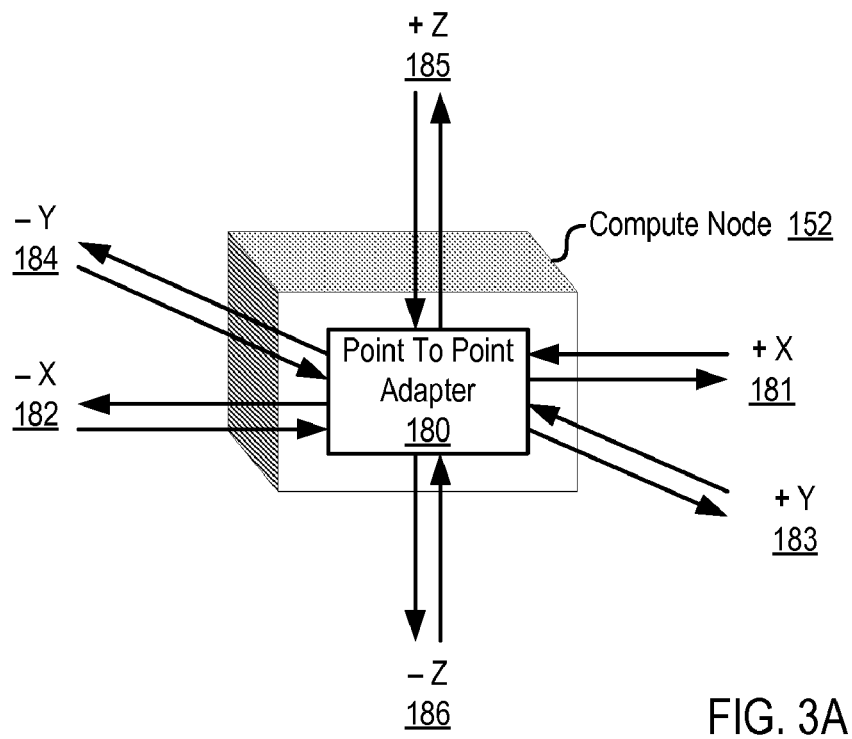
FIG. 3A illustrates an exemplary Point To Point Adapter useful in a parallel computer capable of broadcasting collective operation contributions throughout a parallel computer according to embodiments of the present invention.

For further explanation, FIG. 3A illustrates an exemplary Point To Point Adapter (180) useful in a parallel computer capable of broadcasting collective operation contributions throughout the parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
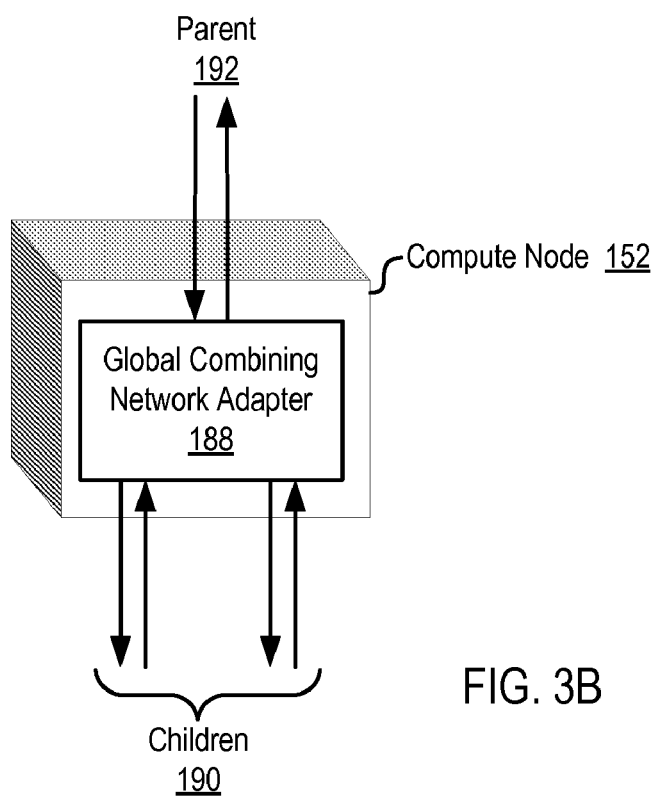
FIG. 3B illustrates an exemplary Global Combining Network Adapter useful in a parallel computer capable of broadcasting collective operation contributions throughout a parallel computer according to embodiments of the present invention.

For further explanation, FIG. 3B illustrates an exemplary Global Combining Network Adapter (188) useful in a parallel computer capable of broadcasting collective operation contributions throughout the parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link formed from two unidirectional data communications paths.

Figure 4:
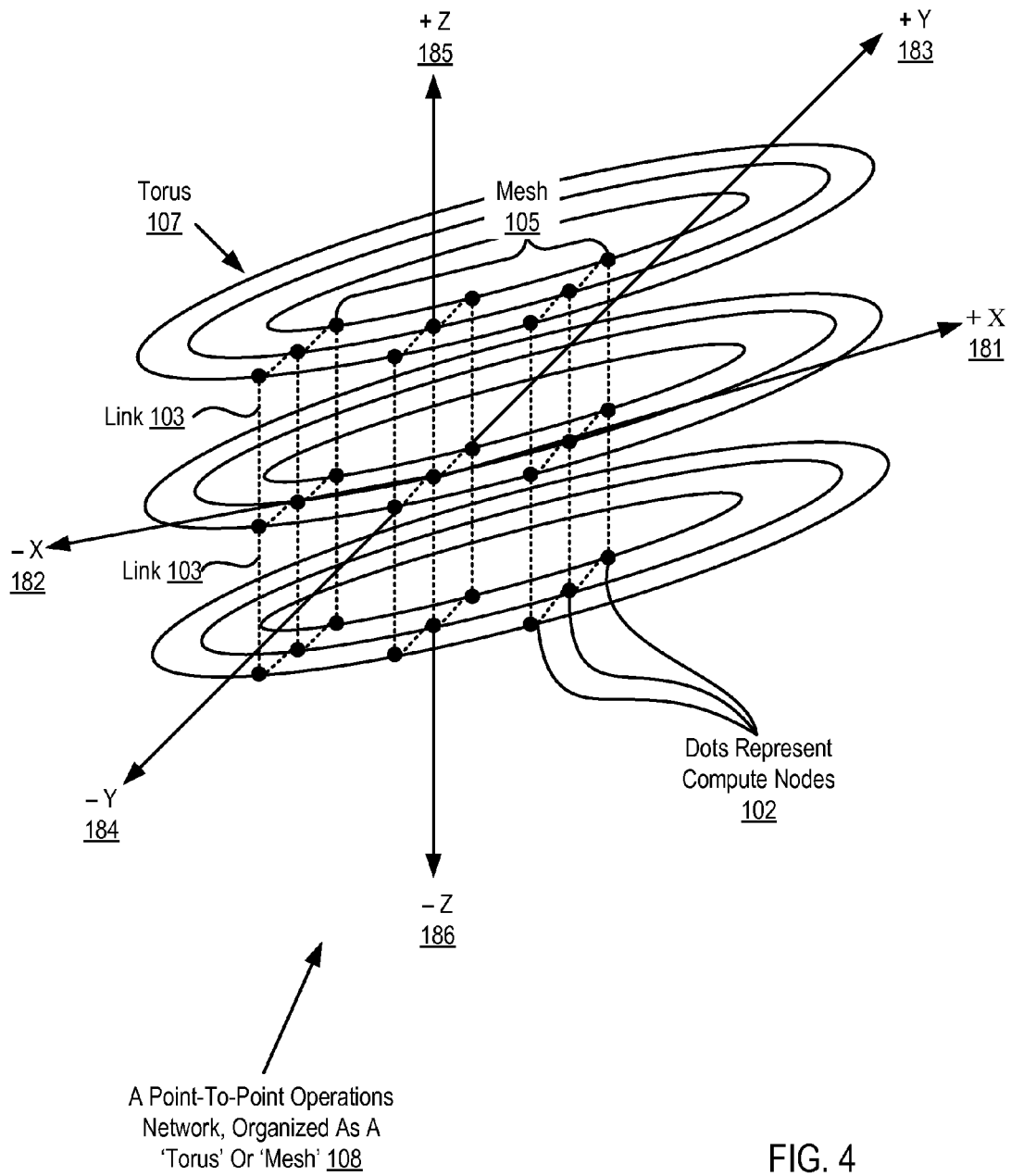
FIG. 4 sets forth a line drawing illustrating an exemplary data communications network optimized for point to point operations useful in a parallel computer capable of broadcasting collective operation contributions throughout a parallel computer according to embodiments of the present invention.

For further explanation, FIG. 4 sets forth a line drawing illustrating an exemplary data communications network (108) optimized for point to point operations useful in a parallel computer capable of broadcasting collective operation contributions throughout the parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in broadcasting collective operation contributions throughout a parallel computer in accordance with embodiments of the present invention may contain only a few compute nodes or may contain thousands of compute nodes.

Figure 5:
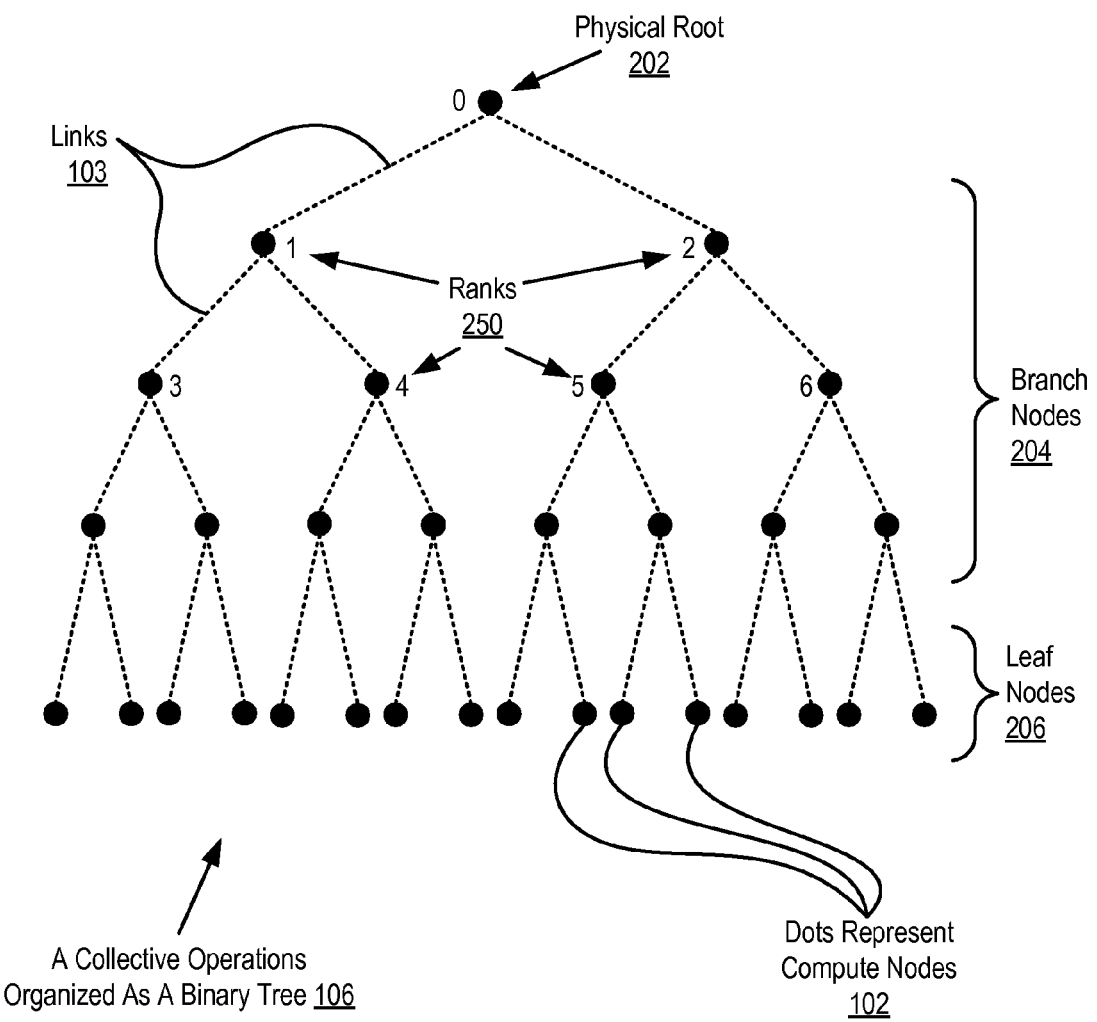
FIG. 5 sets forth a line drawing illustrating an exemplary data communications network optimized for collective operations useful in a parallel computer capable of broadcasting collective operation contributions throughout a parallel computer according to embodiments of the present invention.

For further explanation, FIG. 5 sets forth a line drawing illustrating an exemplary data communications network (106) optimized for collective operations useful in a parallel computer capable of broadcasting collective operation contributions throughout the parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for broadcasting collective operation contributions throughout the parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
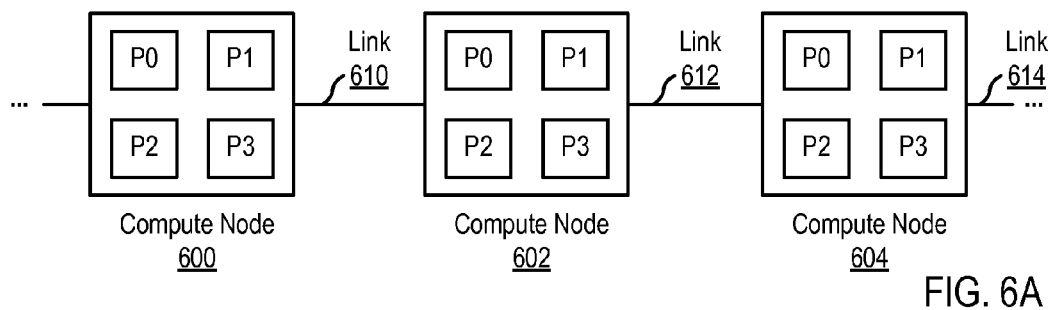
FIG. 6A sets forth a line drawing illustrating exemplary compute nodes of a parallel computer capable of broadcasting collective operation contributions throughout the parallel computer according to embodiments of the present invention.

FIG. 6A sets forth a line drawing illustrating exemplary compute nodes (600, 602, 604) of a parallel computer capable of broadcasting collective operation contributions throughout the parallel computer according to embodiments of the present invention. Each compute node (600, 602, 604) has four processors P0, P1, P2, and P3 for use in collective parallel operations on the parallel computer. The compute nodes (600, 602, 604) in the example of FIG. 6A are connected together in a logical ring such that each compute node (600, 602, 604) has a single designated network link for transmitting the collective operation contributions of each processor on that compute node. For example, the compute node (600) transmits collective operation contributions using designated network link (610), the compute node (602) transmits collective operation contributions using designated network link (612), and the compute node (604) transmits collective operation contributions using designated network link (614).

Figure 6B:
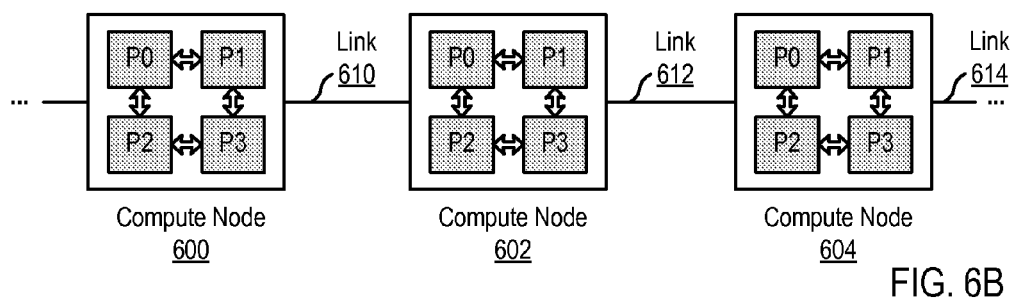
FIG. 6B sets forth a line drawing illustrating each processor on each exemplary compute node of FIG. 6A transmitting that processor's collective operation contribution to the other processors on that compute node using intra-node communications according to embodiments of the present invention.

FIG. 6B sets forth a line drawing illustrating each processor on each exemplary compute node (600, 602, 604) of FIG. 6A transmitting that processor's collective operation contribution to the other processors on that compute node using intra-node communications according to embodiments of the present invention. FIG. 6B illustrates each processor on each compute node (600, 602, 604) transmitting that processor's collective operation contribution to the other processors on that compute node using intra-node communications by shading each processor and through use of double arrows between the processors of the compute nodes.

Figure 6C:
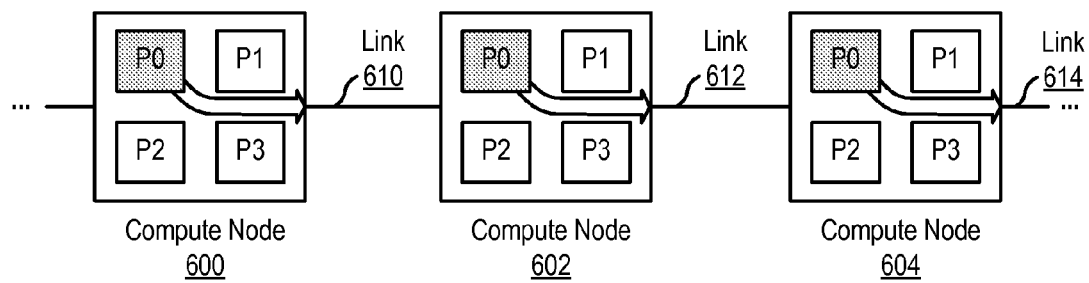
FIG. 6C sets forth a line drawing illustrating processor P0 on each exemplary compute node of FIG. 6A transmitting on a designated network link, according to a serial processor transmission sequence, that processor's collective operation contribution to the other processors on the other compute nodes using inter-node communications according to embodiments of the present invention.
Figure 6D:
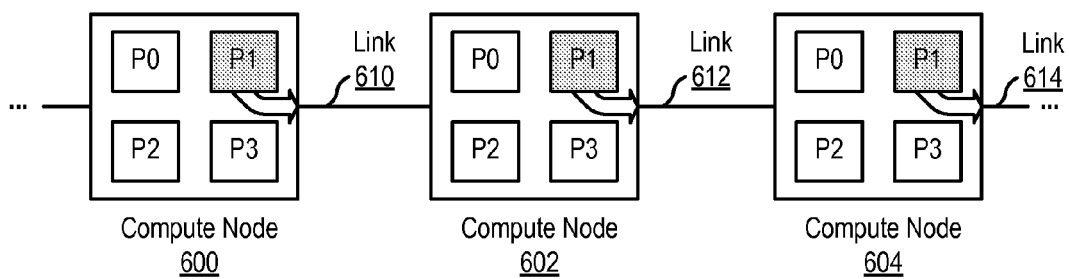
FIG. 6D sets forth a line drawing illustrating processor P1 on each exemplary compute node of FIG. 6A transmitting on a designated network link, according to a serial processor transmission sequence, that processor's collective operation contribution to the other processors on the other compute nodes using inter-node communications according to embodiments of the present invention.

FIGS. 6C and 6D set forth line drawings illustrating processor P0 and P1 on each exemplary compute node (600, 602, 604) of FIG. 6A transmitting on a designated network link, according to a serial processor transmission sequence, that processor's collective operation contribution to the other processors on the other compute nodes using inter-node communications according to embodiments of the present invention. The serial processor transmission sequence specifies the order in which each processor on a compute node may access the designated network link for transmitting a collective operation contribution. In the example of FIGS. 6C and 6D, the serial processor transmission sequence is as follows: processor P0 uses the designated link first, processor P1 uses the designated link second, processor P2 uses the designated link third, and processor P3 uses the designated link last.

FIG. 6C illustrates processor P0 on each compute node (600, 602, 604) transmitting that processor's collective operation contribution during the first phase of the serial processor transmission sequence through use of shading and an arrow from the processor P0 to the respective link (610, 612, 614). In the example of FIG. 6C, processor P0 on compute node (600) transmits processor P0's collective operation contribution to compute node (602) using designated network link (610). Processor P0 on compute node (602) transmits processor P0's collective operation contribution to compute node (604) using designated network link (612). Processor P0 on compute node (604) transmits processor P0's collective operation contribution to some other compute node (not shown) using designated network link (614).

Similarly, FIG. 6D illustrates processor P1 on each compute node (600, 602, 604) transmitting that processor's collective operation contribution during the second phase of the serial processor transmission sequence through use of shading and an arrow from the processor P1 to the respective link (610, 612, 614). In the example of FIG. 6D, processor P1 on compute node (600) transmits processor P1's collective operation contribution to compute node (602) using designated network link (610). Processor P1 on compute node (602) transmits processor P1's collective operation contribution to compute node (604) using designated network link (612). Processor P1 on compute node (604) transmits processor P1's collective operation contribution to some other compute node (not shown) using designated network link (614).

Figure 7:
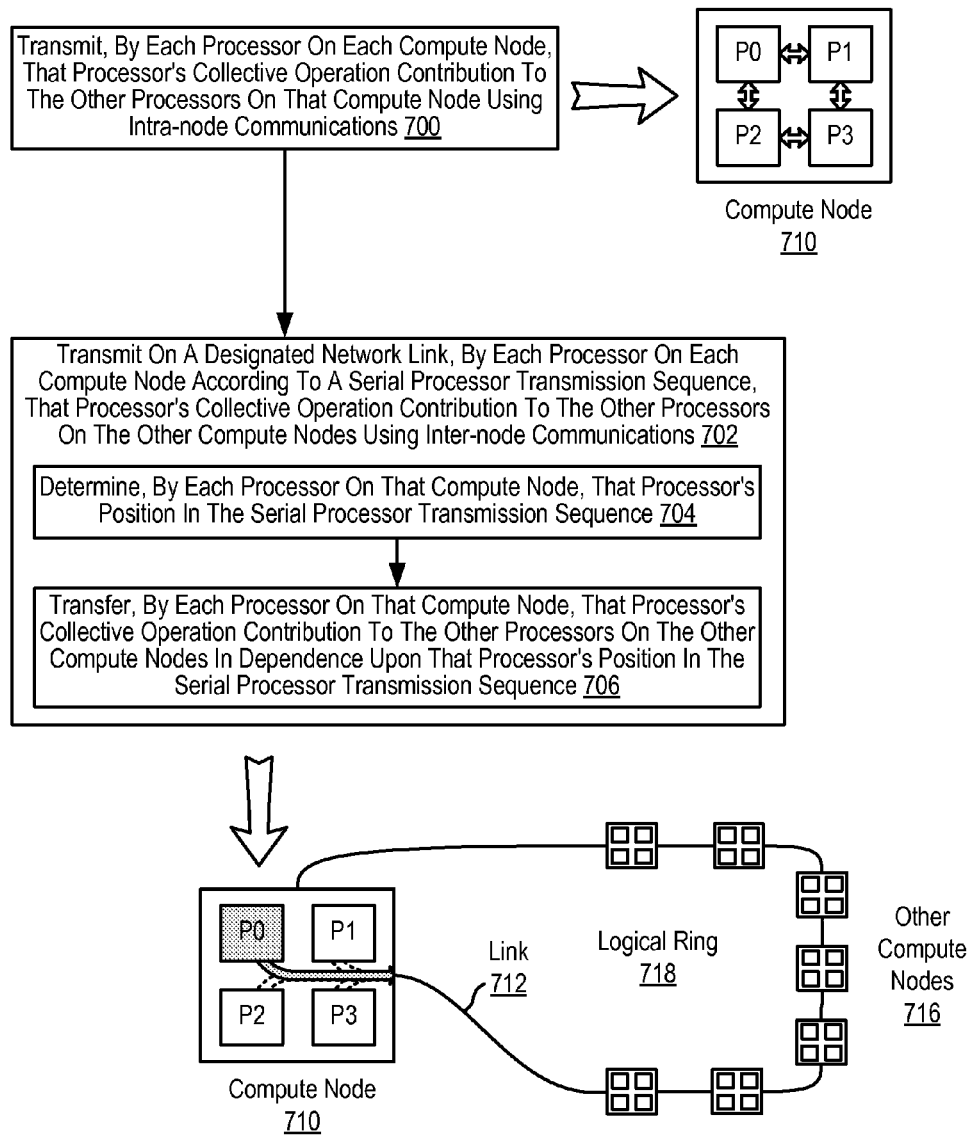
FIG. 7 sets forth a flow chart illustrating an exemplary method for broadcasting collective operation contributions throughout a parallel computer according to the present invention.

For further explanation, FIG. 7 sets forth a flow chart illustrating an exemplary method for broadcasting collective operation contributions throughout a parallel computer according to the present invention. The parallel computer described with reference to FIG. 7 includes a plurality of compute nodes connected together through a data communications network. Each compute node compute node has a plurality of processors for use in collective parallel operations on the parallel computer. For example, FIG. 7 illustrates compute node (710), which has four processors P0, P1, P2, and P3.

The method of FIG. 7 includes transmitting (700), by each processor on each compute node, that processor's collective operation contribution to the other processors on that compute node using intra-node communications. Each processor may carry out transmitting (700) that processor's collective operation contribution to the other processors on that compute node according to the method of FIG. 7 by retrieving that processor's collective operation contribution from a contribution buffer associated with the collective operation process executing on that processor. The intra-node communications used by the processors on each compute node may be carried out using shared memory operations, direct memory access ('DMA') operations, or message passing operations. Because these operations typically do not utilize any network resources external to the compute node, no contention occurs on the network while each process transmits its collective operations contribution to the other processor on the same compute node.

In the example of FIG. 7, the compute nodes (710, 716) are connected together in a logical ring (718) such that each compute node (710, 716) has a single designated network link for transmitting the collective operation contributions of each processor on that compute node. For example, compute node (710) of FIG. 7 has a single designated link (712) for transmitting the collective operation contributions of each processor on compute node (710). The other link connected to compute node (710) is for receiving collective operation contributions from the other compute nodes (716) in the logical ring (718).

The method of FIG. 7 includes transmitting (702) on a designated network link, by each processor on each compute node according to a serial processor transmission sequence, that processor's collective operation contribution to the other processors on the other compute nodes using inter-node communications. As mentioned above, the serial processor transmission sequence specifies the order in which each processor on a compute node may access the designated network link for transmitting a collective operation contribution through the network to another compute node. Such serialization of the transmission by each processor on a compute node is achieved by synchronization among the processors through a synchronization message or shared memory synchronization variable. Each processor on each compute node may transmit (702) that processor's collective operation contribution to the other processors on the other compute nodes according to the method of FIG. 7 by determining (704) that processor's position in the serial processor transmission sequence and transferring (706) that processor's collective operation contribution to the other processors on the other compute nodes in dependence upon that processor's position in the serial processor transmission sequence.

Each processor on each compute node may determine (704) that processor's position in the serial processor transmission sequence according to the method of FIG. 7 by comparing the processor's identifier to the serial processor transmission sequence specified by the collective operation process executing on that processor. Consider, for example, the compute node (710) illustrated in FIG. 7. Further consider that the serial processor transmission sequence for compute node (710) is as follows: processor P0 uses the designated link (712) first, processor P1 uses the designated link (712) second, processor P2 uses the designated link (712) third, and processor P3 uses the designated link (712) last. Processor P0 may compare its processor identifier 'P0' with the serial processor transmission sequence to determine that processor P0 utilizes the designated network link (712) first. Processor P1 may compare its processor identifier 'P1' with the serial processor transmission sequence to determine that processor P1 utilizes the designated network link (712) second, and so on.

Each processor on each compute node may transfer (706) that processor's collective operation contribution to the other processors on the other compute nodes in dependence upon that processor's position in the serial processor transmission sequence according to the method of FIG. 7 by transmitting that processor's collective operation contribution to the other processors on the designated link if that processor's position is first in the serial processor transmission sequence and, if that processor's position is not first in the serial processor transmission sequence, transmitting that processor's collective operation contribution to the other processors on the designated link after being notified by the processor in the position immediately prior to that processor's position that the link is available. Consider again, for example, compute node (710) and the exemplary serial processor transmission sequence mentioned above. Because processor P0 has the first position in the serial processor transmission sequence, FIG. 7 illustrates processor P0 transmitting its collective operation contribution on the designated network link (712) to the other computer nodes (716) through use of shading processor P0 and the arrow from processor P0 to the designated network link (712). After processor P0 transmits its collective operation contribution on the designated network link (712), processor P0 notifies processor P1 that the link (712) is available using a synchronization message or by storing a value in a shared memory variable. Processor P1 then transmits its collective operation contribution on the designated network link (712) to the other computer nodes (716) and notifies processor P2 that the link (712) is available. Processor P2 then transmits its collective operation contribution on the designated network link (712) to the other computer nodes (716) and notifies processor P3 that the link (712) is available. Processor P3 then transmits its collective operation contribution on the designated network link (712) to the other computer nodes (716).

Readers will note that broadcasting collective operation contributions throughout a parallel computer according to the method of FIG. 7 is typically performed as part of a broader collective operation communication such as a gossiping communications pattern. A gossiping communications pattern is a communications pattern in which one set of compute nodes communicates with another set of compute nodes. The two sets of nodes participating in the gossip communications pattern could be the same or different. Examples of gossiping communications patterns implemented using MPI may include an all-to-all operation, an all-to-allv operation, an allgather operation, an allgatherv operation, and so on. In the case where the gossiping communications pattern is implemented as an all-to-all collective operation, while each compute node transmits its processors' collective operation contributions to the other compute nodes, that compute node receives the collective operation contributions of the other processors on the other compute nodes. In such a manner, all of the processors on all of the compute nodes eventually receive all of the collective operation contributions from all of the other processors on all of the other compute nodes, thereby completing the all-to-all collective operation.

FIGS. 6 and 7 describes a parallel computer in which each compute node has a single designated network link for transmitting the collective operation contributions of each processor on that compute node to the other compute nodes in the parallel computer. In some other embodiments, however, each compute node may have multiple designated network links for transmitting the collective operation contributions of each processor on that compute node to the other compute nodes of the parallel computer. The availability of multiple designated network links for each compute node is typically provided when compute nodes are connected in multi-dimensional networks such as, for example, a three-dimensional torus network. For further explanation, FIGS. 8A and 8B set forth line drawings illustrating further exemplary compute nodes capable of broadcasting collective operation contributions throughout a parallel computer according to embodiments of the present invention. The parallel computer described with reference to FIGS. 8A and 8B includes a plurality of compute nodes (800, 802, 804, 806, 808) that connect together through a data communications network. Each compute node (800, 802, 804, 806, 808) has a plurality of processors P0-P15 for use in collective parallel operations on the parallel computer.

Figure 8A:
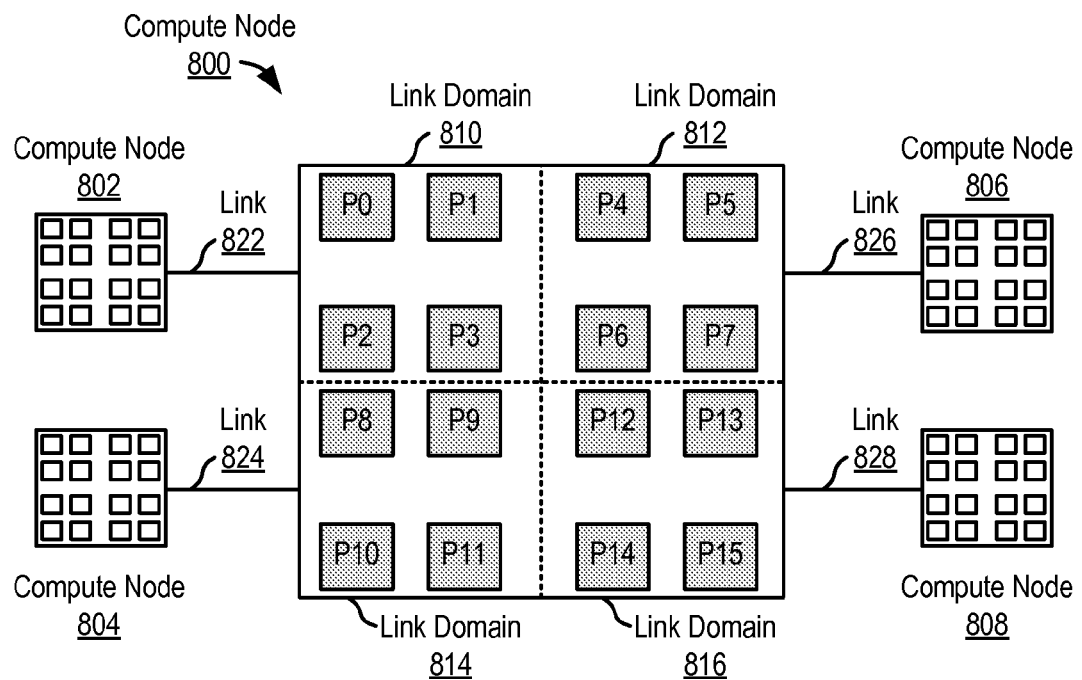
FIG. 8A sets forth a line drawing illustrating further exemplary compute nodes capable of broadcasting collective operation contributions throughout a parallel computer according to embodiments of the present invention.
Figure 8B:
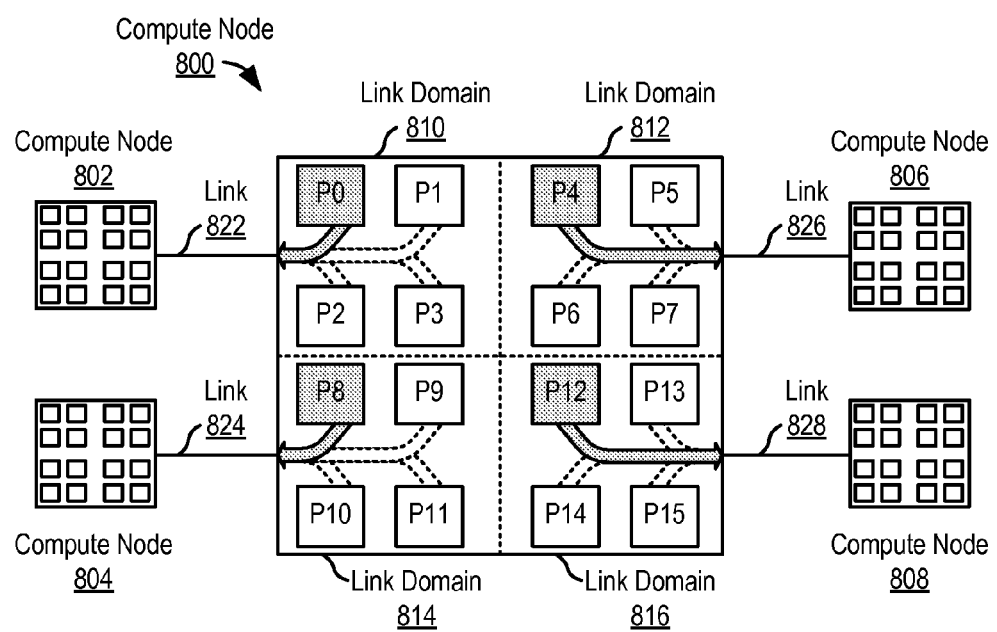
FIG. 8B sets forth a line drawing illustrating further exemplary compute nodes capable of broadcasting collective operation contributions throughout a parallel computer according to embodiments of the present invention.

Each compute node (800, 802, 804, 806, 808) has a plurality of designated network links for transmitting the collective operation contributions of each processor on that compute node. In particular, FIGS. 8A and 8B illustrate compute node (800) having designated network links (822, 824, 826, 828) for transmitting the collective operation contributions of each processor on that compute node (800) to the other compute nodes (802, 804, 806, 808) in the parallel computer. Each designated network link (822, 824, 826, 828) uniquely corresponds to one of a plurality of network link domains (810, 812, 814, 816) for that compute node (800). A network link domain is comprised of a subset of processors on a compute node organized together and configured to use a single designated network link available to the compute node. In the examples of FIGS. 8A and 8B, processors P0-P3 are organized into link domain (810), which in turn corresponds with designated network link (822). Processors P4-P7 are organized into link domain (812), which in turn corresponds with designated network link (826). Processors P8-P11 are organized into link domain (814), which in turn corresponds with designated network link (824). Processors P12-P15 are organized into link domain (816), which in turn corresponds with designated network link (828).

Each network link domain (810, 812, 814, 816) has a serial domain processor transmission sequence that specifies the order in which each processor in that network link domain may access the designated network link corresponding to that domain for transmitting a collective operation contribution through the network to another compute node. For example in FIGS. 8A and 8B, the serial domain processor transmission sequence for network link domain (810) is as follows: processor P0 uses the designated link (822) first, processor P1 uses the designated link (822) second, processor P2 uses the designated link (822) third, and processor P3 uses the designated link (822) last. The serial domain processor transmission sequence for network link domain (812) is as follows: processor P4 uses the designated link (826) first, processor P5 uses the designated link (826) second, processor P6 uses the designated link (826) third, and processor P7 uses the designated link (826) last. The serial domain processor transmission sequence for network link domain (814) is as follows: processor P8 uses the designated link (824) first, processor P9 uses the designated link (824) second, processor P10 uses the designated link (824) third, and processor P11 uses the designated link (824) last. The serial domain processor transmission sequence for network link domain (814) is as follows: processor P12 uses the designated link (828) first, processor P13 uses the designated link (828) second, processor P14 uses the designated link (828) third, and processor P15 uses the designated link (828) last. Readers will note that such serial domain processor transmission sequences above are for explanation only and not for limitation.

In FIG. 8A, each processor P0-P15 on compute node (800) transmits that processor's collective operation contribution to the other processors on that compute node using intra-node communications. FIG. 8A illustrates such intra-node communications by shading processors P0-P15 to represent that those processors are exchanging their collective operation contributions with one another.

FIG. 8B illustrates each processor P0, P4, P8, and P12 on the compute node (800) transmitting that processor's collective operation contribution according to the serial domain processor transmission sequence for the network link domain in which that processor is organized. FIG. 8B illustrates such a transmission by shading each processor P0, P4, P8, and P12 and through use of a shaded arrow between each processor P0, P4, P8, and P12 and the designated link for each processor P0, P4, P8, and P12. Because each processor P0, P4, P8, and P12 belongs to a different link domain and each link domain has its own designated network link, processors P0, P4, P8, and P12 may transmit their collective operation contributions to the other compute nodes in the parallel computer simultaneously during the first phase of the serial domain processor transmission sequence for each network link domain (810, 812, 814, 816). Using the exemplary serial domain processor transmission sequences above for the network link domains (810, 812, 814, 816), processors P1, P5, P9, and P13 transmit their collective operation contributions on the designated network links (822, 826, 824, 828) after processors P0, P4, P8, and P12. Processors P2, P6, P10, and P14 then transmit their collective operation contributions on the designated network links (822, 826, 824, 828) after processors P1, P5, P9, and P13. Processors P3, P7, P11, and P15 then transmit their collective operation contributions on the designated network links (822, 826, 824, 828) after processors P2, P6, P10, and P14.

Figure 9:
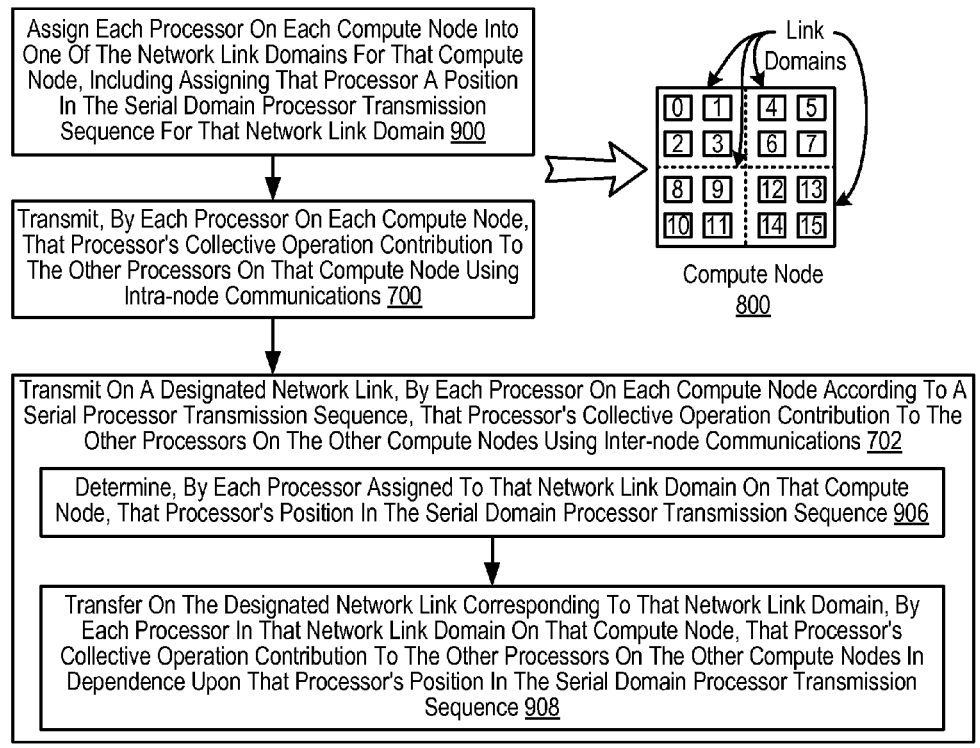
FIG. 9 sets forth a flow chart illustrating a further exemplary method for broadcasting collective operation contributions throughout a parallel computer according to the present invention.
Figure 9:
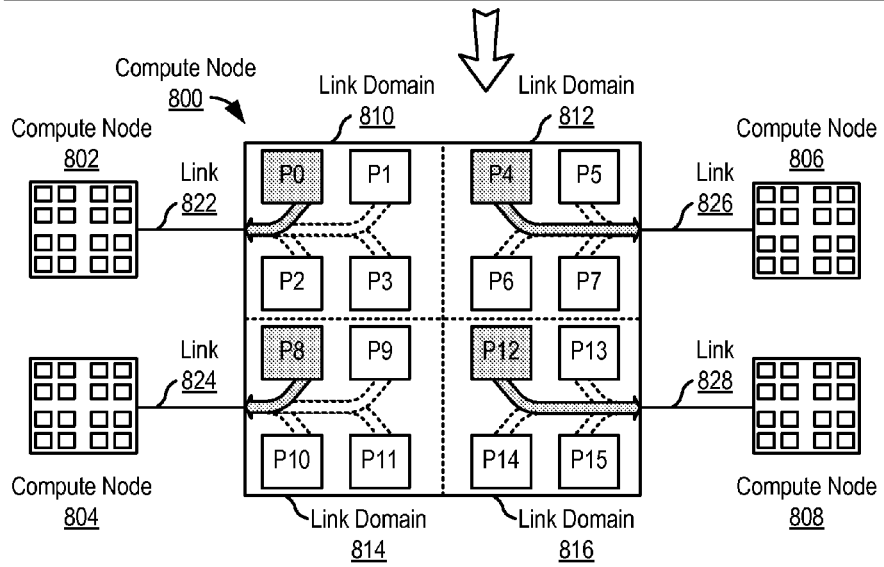

For further explanation, FIG. 9 sets forth a flow chart illustrating a further exemplary method for broadcasting collective operation contributions throughout a parallel computer according to the present invention. The parallel computer described with reference to FIG. 9 includes a plurality of compute nodes connected together through a data communications network. Each compute node has a plurality of processors for use in collective parallel operations on the parallel computer. Specifically, FIG. 9 illustrates a compute node (800) having a processors P0-P15.

In the example of FIG. 9, the compute node (800) has a plurality of designated network links for transmitting the collective operation contributions of each processor on that compute node. In particular, the compute node (800) has designated network links (822, 824, 826, 828) for transmitting the collective operation contributions of each processor on that compute node (800) to the other compute nodes (802, 804, 806, 808) in the parallel computer. Each designated network link (822, 824, 826, 828) uniquely corresponds to one of a plurality of network link domains (810, 812, 814, 816) for that compute node (800). That is, for each designated network link, there may exist a single network link domain on that compute node. As mentioned above, a network link domain is a subset of processors on a compute node organized together and configured to use a single designated network link available to the compute node. In the example of FIG. 9, processors P0-P3 are organized into link domain (810), which in turn corresponds with designated network link (822). Processors P4-P7 are organized into link domain (812), which in turn corresponds with designated network link (826). Processors P8-P11 are organized into link domain (814), which in turn corresponds with designated network link (824). Processors P12-P15 are organized into link domain (816), which in turn corresponds with designated network link (828).

The method of FIG. 9 includes assigning (900) each processor on each compute node into one of the network link domains for that compute node, including assigning that processor a position in the serial domain processor transmission sequence for that network link domain. Assigning (900) each processor on each compute node into one of the network link domains for that compute node according to the method of FIG. 9 may be carried out by distributing the processors into network link domains for that compute node using a round-robin algorithm. In some other embodiments, assigning (900) each processor on each compute node into one of the network link domains for that compute node according to the method of FIG. 9 may be carried out based on the processors' physical locations on the compute node such that processors in close proximity are grouped together in a link domain. In still further embodiments, assigning (900) each processor on each compute node into one of the network link domains for that compute node according to the method of FIG. 9 may be carried out based on a predetermined domain configuration established by a system administrator.

Each network link domain (810, 812, 814, 816) has a serial domain processor transmission sequence that specifies the order in which each processor in that network link domain may access the designated network link corresponding to that domain for transmitting a collective operation contribution through the network to another compute node. In some embodiments, the serial domain processor transmission sequence for each domain is predetermined by a system administrator. In such embodiments, assigning (900) each processor in each network link domain a position in the serial domain processor transmission sequence for that network link domain according to the method of FIG. 9 may be carried out using the predetermined serial domain processor transmission sequence for that particular network link domain or some algorithm such as, for example, an algorithm to randomly order the processors in the serial domain processor transmission sequence.

In FIG. 9, the serial domain processor transmission sequence for network link domain (810) is as follows: processor P0 uses the designated link (822) first, processor P1 uses the designated link (822) second, processor P2 uses the designated link (822) third, and processor P3 uses the designated link (822) last. The serial domain processor transmission sequence for network link domain (812) is as follows: processor P4 uses the designated link (826) first, processor P5 uses the designated link (826) second, processor P6 uses the designated link (826) third, and processor P7 uses the designated link (826) last. The serial domain processor transmission sequence for network link domain (814) is as follows: processor P8 uses the designated link (824) first, processor P9 uses the designated link (824) second, processor P10 uses the designated link (824) third, and processor P11 uses the designated link (824) last. The serial domain processor transmission sequence for network link domain (814) is as follows: processor P12 uses the designated link (828) first, processor P13 uses the designated link (828) second, processor P14 uses the designated link (828) third, and processor P15 uses the designated link (828) last. Readers will note that such serial domain processor transmission sequences above are for explanation only and not for limitation.

The method of FIG. 9 includes transmitting (700), by each processor on each compute node, that processor's collective operation contribution to the other processors on that compute node using intra-node communications. Each processor may transmit (700) that processor's collective operation contribution to the other processors on that compute node according to the method of FIG. 9 by retrieving that processor's collective operation contribution from a contribution buffer associated with the collective operation process executing on that processor. The intra-node communications used by the processors on each compute node may be carried out using shared memory operations, DMA operations, or message passing operations. Because these operations do not utilize any network resources external to the compute node, no contention occurs on the network while each process transmits its collective operations contribution to the other processor on the same compute node.

The method of FIG. 9 also includes transmitting (702) on a designated network link, by each processor on each compute node according to a serial processor transmission sequence, that processor's collective operation contribution to the other processors on the other compute nodes using inter-node communications. Each processor on each compute node may transmit (702) that processor's collective operation contribution to the other processors on the other compute nodes according to the method of FIG. 9 by performing in parallel for each network link domain: determining (906), by each processor assigned to that network link domain on that compute node, that processor's position in the serial domain processor transmission sequence and transferring (908) on the designated network link corresponding to that network link domain, by each processor in that network link domain on that compute node, that processor's collective operation contribution to the other processors on the other compute nodes in dependence upon that processor's position in the serial domain processor transmission sequence.

Each processor in each link domain may determine (906) that processor's position in the serial domain processor transmission sequence according to the method of FIG. 9 by comparing the processor's identifier to the serial domain processor transmission sequence specified by the collective operation process executing on that processor. Consider again the serial domain processor transmission sequence for the network link domain (810) in which processor P0 access link (822) first, processor P1 accesses link (822) second, processor P2 accesses link (822) third, and processor P3 accesses link (822) last. Processor P0 may compare its processor identifier 'P0' with the serial domain processor transmission sequence to determine that processor P0 utilizes the designated network link (822) first. Processor P1 may compare its processor identifier 'P1' with the serial domain processor transmission sequence to determine that processor P1 utilizes the designated network link (822) second, and so on.

Each processor in each link domain may transfer (908) that processor's collective operation contribution to the other processors on the other compute nodes in dependence upon that processor's position in the serial domain processor transmission sequence according to the method of FIG. 9 by transmitting that processor's collective operation contribution to the other compute nodes on the designated link if that processor's position is first in the serial domain processor transmission sequence and, if that processor's position is not first in the serial domain processor transmission sequence, transmitting that processor's collective operation contribution to the other compute nodes on the designated link after being notified by the processor in the position immediately prior to that processor's position that the link is available.

For further explanation, consider again the exemplary serial domain processor transmission sequences described above for domains (810, 812, 814, 816). FIG. 9 illustrates the processors P0, P4, P8, and P12 transmitting their collective operation contributions on the designated network links for each processors' respective link domain during the first phase of the serial domain processor transmission sequence for each link domain. During the second phase of the serial domain processor transmission sequence for each link domain (810, 812, 814, 816), the processors P1, P5, P9, and P13 transmit their collective operation contributions on the designated network links for each processors' respective link domain. During the third phase of the serial domain processor transmission sequence for each link domain (810, 812, 814, 816), the processors P2, P6, P10, and P14 transmit their collective operation contributions on the designated network links for each processors' respective link domain. During the last phase of the serial domain processor transmission sequence for each link domain (810, 812, 814, 816), the processors P3, P7, P11, and P15 transmit their collective operation contributions on the designated network links for each processors' respective link domain.

Readers will note that having multiple designated network links for transmitting collective operation contributions to other compute nodes allows multiple subsets of processors on each compute node to transmit their collective operation contributions in parallel. Within each processor subset, however, the processors access their designed network link one at a time in accordance with the serial domain processor transmission sequence to reduce or eliminate contention on that network link.

Exemplary embodiments of the present invention are described largely in the context of a fully functional parallel computer system for providing nearest neighbor point-to-point communications among compute nodes of an operational group in a global combining network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of broadcasting collective operation contributions throughout a parallel computer, the parallel computer comprising a plurality of compute nodes connected together through a data communications network, each compute node having a plurality of processors for use in collective parallel operations on the parallel computer, each collective parallel operation comprising a message passing computer program instruction executed simultaneously by all processors in all compute nodes of the parallel computer, the method comprising:

transmitting, by each processor on each compute node responsive to each processor's simultaneous execution of a message passing computer program instruction of a collective parallel operation, that processor's collective operation contribution to the other processors on that compute node using intra-node communications;

transmitting on a designated network link, by each processor on each compute node according to a serial processor transmission sequence, that processor's collective operation contribution to the other processors on the other compute nodes using inter-node communications, wherein the serial processor transmission sequence specifies the order in which each processor on a compute node may access the designated network link for transmitting a collective operation contribution through the network to another compute node, wherein each processor's collective operation contribution comprises data contributed by that processor to effect the collective parallel operation; and wherein transmitting on a designated network link comprises:

determining, by each processor on that compute node, that processor's position in the serial processor transmission sequence, and transferring, by each processor on that compute node, that processor's collective operation contribution to the other processors on the other compute nodes in dependence upon that processor's position in the serial processor transmission sequence.

2. The method of claim 1 wherein:

each compute node has a single designated network link for transmitting the collective operation contributions of each processor on that compute node.

3. The method of claim 1 wherein:

each compute node has a plurality of designated network links for transmitting the collective operation contributions of each processor on that compute node, each designated network link for each compute node uniquely corresponding to one of a plurality of network link domains for that compute node in which a subset of the processors for that compute node are organized, each network link domain having a serial domain processor transmission sequence;

the method further comprises assigning each processor on each compute node into one of the network link domains for that compute node, including assigning that processor a position in the serial domain processor transmission sequence for that network link domain; and transmitting on a designated network link, by each processor on each compute node according to a serial processor transmission sequence, that processor's collective operation contribution to the other processors on the other compute nodes using inter-node communications further comprises performing in parallel for each network link domain:

determining, by each processor assigned to that network link domain on that compute node, that processor's position in the serial domain processor transmission sequence, and transferring on the designated network link corresponding to that network link domain, by each processor in that network link domain on that compute node, that processor's collective operation contribution to the other processors on the other compute nodes in dependence upon that processor's position in the serial domain processor transmission sequence.

4. The method of claim 1 wherein the intra-node communications are carried out using shared memory operations, direct memory access ('DMA') operations, or message passing operations.

5. The method of claim 1 wherein broadcasting collective operation contributions is carried out as part of a gossiping communications pattern.

6. The method of claim 1 wherein the plurality of compute nodes are connected together through a plurality of data communications networks, at least one of the data communications networks optimized for point to point data communications, at least one of the data communications networks optimized for collective operations.

7. A parallel computer for broadcasting collective operation contributions throughout a parallel computer, the parallel computer comprising a plurality of compute nodes connected together through a data communications network, each compute node having a plurality of processors for use in collective parallel operations on the parallel computer, each collective parallel operation comprising a message passing computer program instruction executed simultaneously by all processors in all compute nodes of the parallel computer, the parallel computer comprising computer memory operatively coupled to the processors of the parallel computer, the computer memory having disposed within it computer program instructions capable of:

transmitting, by each processor on each compute node responsive to each processor's simultaneous execution of a message passing computer program instruction of a collective parallel operation, that processor's collective operation contribution to the other processors on that compute node using intra-node communications;

transmitting on a designated network link, by each processor on each compute node according to a serial processor transmission sequence, that processor's collective operation contribution to the other processors on the other compute nodes using inter-node communications, wherein the serial processor transmission sequence specifies the order in which each processor on a compute node may access the designated network link for transmitting a collective operation contribution through the network to another compute node, wherein each processor's collective operation contribution comprises data contributed by that processor to effect the collective parallel operation; and wherein transmitting on a designated network link comprises:

determining, by each processor on that compute node, that processor's position in the serial processor transmission sequence, and transferring, by each processor on that compute node, that processor's collective operation contribution to the other processors on the other compute nodes in dependence upon that processor's position in the serial processor transmission sequence.

8. The parallel computer of claim 7 wherein:

each compute node has a single designated network link for transmitting the collective operation contributions of each processor on that compute node.

9. The parallel computer of claim 7 wherein:

each compute node has a plurality of designated network links for transmitting the collective operation contributions of each processor on that compute node, each designated network link for each compute node uniquely corresponding to one of a plurality of network link domains for that compute node in which a subset of the processors for that compute node are organized, each network link domain having a serial domain processor transmission sequence;

the computer memory has disposed within it computer program instructions capable of assigning each processor on each compute node into one of the network link domains for that compute node, including assigning that processor a position in the serial domain processor transmission sequence for that network link domain; and transmitting on a designated network link, by each processor on each compute node according to a serial processor transmission sequence, that processor's collective operation contribution to the other processors on the other compute nodes using inter-node communications further comprises performing in parallel for each network link domain:

determining, by each processor assigned to that network link domain on that compute node, that processor's position in the serial domain processor transmission sequence, and transferring on the designated network link corresponding to that network link domain, by each processor in that network link domain on that compute node, that processor's collective operation contribution to the other processors on the other compute nodes in dependence upon that processor's position in the serial domain processor transmission sequence.

10. The parallel computer of claim 7 wherein the intra-node communications are carried out using shared memory operations, direct memory access ('DMA') operations, or message passing operations.

11. The parallel computer of claim 7 wherein broadcasting collective operation contributions is carried out as part of a gossiping communications pattern.

12. The parallel computer of claim 7 wherein the plurality of compute nodes are connected together through a plurality of data communications networks, at least one of the data communications networks optimized for point to point data communications, at least one of the data communications networks optimized for collective operations.

13. A computer program product for broadcasting collective operation contributions throughout a parallel computer, the parallel computer comprising a plurality of compute nodes connected together through a data communications network, each compute node having a plurality of processors for use in collective parallel operations on the parallel computer, each collective parallel operation comprising a message passing computer program instruction executed simultaneously by all processors in all compute nodes of the parallel computer, the computer program product disposed upon a computer readable recordable medium, the computer program product comprising computer program instructions capable of:

transmitting, by each processor on each compute node responsive to each processor's simultaneous execution of a message passing computer program instruction of a collective parallel operation, that processor's collective operation contribution to the other processors on that compute node using intra-node communications;

transmitting on a designated network link, by each processor on each compute node according to a serial processor transmission sequence, that processor's collective operation contribution to the other processors on the other compute nodes using inter-node communications, wherein the serial processor transmission sequence specifies the order in which each processor on a compute node may access the designated network link for transmitting a collective operation contribution through the network to another compute node, wherein each processor's collective operation contribution comprises data contributed by that processor to effect the collective parallel operation; and wherein transmitting on a designated network link comprises:

determining, by each processor on that compute node, that processor's position in the serial processor transmission sequence, and transferring, by each processor on that compute node, that processor's collective operation contribution to the other processors on the other compute nodes in dependence upon that processor's position in the serial processor transmission sequence.

14. The computer program product of claim 13 wherein: each compute node has a single designated network link for transmitting the collective operation contributions of each processor on that compute node.

15. The computer program product of claim 13 wherein: each compute node has a plurality of designated network links for transmitting the collective operation contributions of each processor on that compute node, each designated network link for each compute node uniquely corresponding to one of a plurality of network link domains for that compute node in which a subset of the processors for that compute node are organized, each network link domain having a serial domain processor transmission sequence;

the computer program product further comprises computer program instructions capable of assigning each processor on each compute node into one of the network link domains for that compute node, including assigning that processor a position in the serial domain processor transmission sequence for that network link domain; and transmitting on a designated network link, by each processor on each compute node according to a serial processor transmission sequence, that processor's collective operation contribution to the other processors on the other compute nodes using inter-node communications further comprises performing in parallel for each network link domain:

determining, by each processor assigned to that network link domain on that compute node, that processor's position in the serial domain processor transmission sequence, and transferring on the designated network link corresponding to that network link domain, by each processor in that network link domain on that compute node, that processor's collective operation contribution to the other processors on the other compute nodes in dependence upon that processor's position in the serial domain processor transmission sequence.

16. The computer program product of claim 13 wherein the intra-node communications are carried out using shared memory operations, direct memory access ('DMA') operations, or message passing operations.

17. The computer program product of claim 13 wherein broadcasting collective operation contributions is carried out as part of a gossiping communications pattern.

18. The computer program product of claim 13 wherein the plurality of compute nodes are connected together through a plurality of data communications networks, at least one of the data communications networks optimized for point to point data communications, at least one of the data communications networks optimized for collective operations.

* * * * *